(12) United States Patent
Seidman et al.

(10) Patent No.: US 8,562,014 B2
(45) Date of Patent: Oct. 22, 2013

(54) ADAPTOR FOR JOINING TOWING BAR TO NOSE WHEEL OF AIRCRAFT

(76) Inventors: Michael D. Seidman, West Bloomfield, MI (US); Steven Seidman, West Bloomfield, MI (US)

(*) Notice: Subject to any disclaimer, the term of this patent is extended or adjusted under 35 U.S.C. 154(b) by 132 days.

(21) Appl. No.: 13/078,111

(22) Filed: Apr. 1, 2011

(65) Prior Publication Data
US 2012/0248738 A1 Oct. 4, 2012

(51) Int. Cl.
*B60D 1/14* (2006.01)
(52) U.S. Cl.
USPC .......................................... 280/503; 280/495
(58) Field of Classification Search
USPC ................................................. 280/503, 495
See application file for complete search history.

(56) References Cited

U.S. PATENT DOCUMENTS

| | | | | |
|---|---|---|---|---|
| 2,773,703 A * | 12/1956 | Ferguson et al. | ........... | 280/476.1 |
| 3,004,773 A * | 10/1961 | Ankeney | .................... | 280/446.1 |
| 3,895,828 A * | 7/1975 | Bitantis | .......................... | 280/493 |
| 3,995,878 A * | 12/1976 | Geraci et al. | ................... | 280/488 |
| 4,269,429 A * | 5/1981 | Eichstadt | ....................... | 280/503 |
| 4,470,564 A * | 9/1984 | Johnson | ........................... | 244/50 |
| 4,883,280 A * | 11/1989 | Christian | ........................... | 280/3 |
| 5,494,310 A * | 2/1996 | Soles | ............................. | 280/450 |
| 6,543,790 B2 * | 4/2003 | Johnson | ............................ | 280/3 |

* cited by examiner

*Primary Examiner* — Joseph Rocca
*Assistant Examiner* — Michael Stabley
(74) *Attorney, Agent, or Firm* — Gifford, Krass, Sprinkle, Anderson & Citkowski, P.C.

(57) ABSTRACT

Towing bars for joining towing vehicles to the front wheel axles of aircraft often include a pair of parallel bars having cylindrical bosses connected to the trailing ends of the bars and opposing one another. The bosses are intended to fit into sockets or bores in the opposing ends of the axle. With certain airplanes the bosses may not be long enough to clear the opposed sides of a nose wheel tire sufficiently so that their ends project into the axle openings. An adaptor to allow such towing bars to fit these aircraft includes a cylindrical rod of a diameter adapted to extend into the end bore of the axle joined at its opposite end to a coaxial, larger diameter cylindrical hub having a bore adapted to receive one of the tow bar bosses. The length of the adaptor hub is such that the tow bar arms clear the outer sides of the tire when the cylindrical rod ends are within the axle bores, allowing the nose wheel to freely rotate during towing and prevent damage to the tire.

2 Claims, 2 Drawing Sheets

ADAPTOR FOR JOINING TOWING BAR TO NOSE WHEEL OF AIRCRAFT

FIELD OF THE INVENTION

This invention relates to adaptors for use with tow bars for aircraft, of the type having a pair of parallel arms carrying opposed bosses at their outer ends adapted to fit within bores formed in the outer ends of the nose wheel axle.

BACKGROUND OF THE INVENTION

Airplanes are often towed on the ground using elongated tow bars which engage the plane's nose wheel.

Most tow bars have a forward end adapted to be connected to a towing vehicle such as a truck or the like, usually through a hitch, and the rear end of the bar terminates with a cross bar extending transversely to the length of the tow bar in both directions with a pair of rearward extending arms affixed to each outer end of the cross bar. The opposing sections of the trailing ends of each of these arms carry cylindrical bosses which project in opposition to one another and are adapted to extend into the bores formed in the axle end on each side of the nose wheel.

The trailing arms must be separated sufficiently to clear the nose wheel tire supported on the axle. However, since neither the nose wheel configurations used by different aircraft manufacturers or the tires which may be used on a given nose wheel axle are standard, many of the trailing arms on the tow bar cannot be sufficiently separated to clear a tire supported on the nose wheel axle, to avoid damage to the tire during towing, and still allow the axle-engaging bosses fixed to the rear ends of the arms to project inwardly far enough to engage the bores on opposite ends of the axle.

SUMMARY OF THE INVENTION

Accordingly, the present invention provides elongated adaptors having bores or sockets at one end of a proper configuration to receive one of the inwardly extending tow bar bosses and terminating at the other end in a cylindrical rod adapted to fit into an axle bore. The length of the adaptor is greater than the distance from the outer surface of the nose wheel tire to the adjacent outer end of the wheel axle so that the rearwardly extending arm that supports the boss clears the outside of the tire and does not interfere with rotation of the tire while the vehicle is being towed.

In a preferred embodiment of the invention the adaptor takes the form of a cylindrical rod having a diameter complementary to the axle bore and having its outer end, opposite to the end of the rod that engages the axle, integral with a coaxial cylindrical hub of greater diameter. The outer end of the hub is formed with a central bore or socket adapted to receive the boss formed on the end of the towing bar arm. The length of the adaptor, from the end that extends into the axle bore to the opposite end which receives the towing bar boss, exceeds the distance from the axle end to the outer projection of the nose wheel tire so that the rear arm on the towing bar clears the outside of the tire, allowing the tire to freely rotate while the vehicle is being towed.

BRIEF DESCRIPTION OF THE DRAWINGS

Other objects, advantages, and applications of the present invention will be made apparent by the following detailed description which makes reference to the accompanying drawings in which:

FIG. 4 is a perspective view of an adaptor for connecting a tow bar to the nose wheel axis when connection without the adaptor would interfere with the nose wheel tire.

DETAILED DESCRIPTION OF THE PREFERRED EMBODIMENTS

Figure 1:
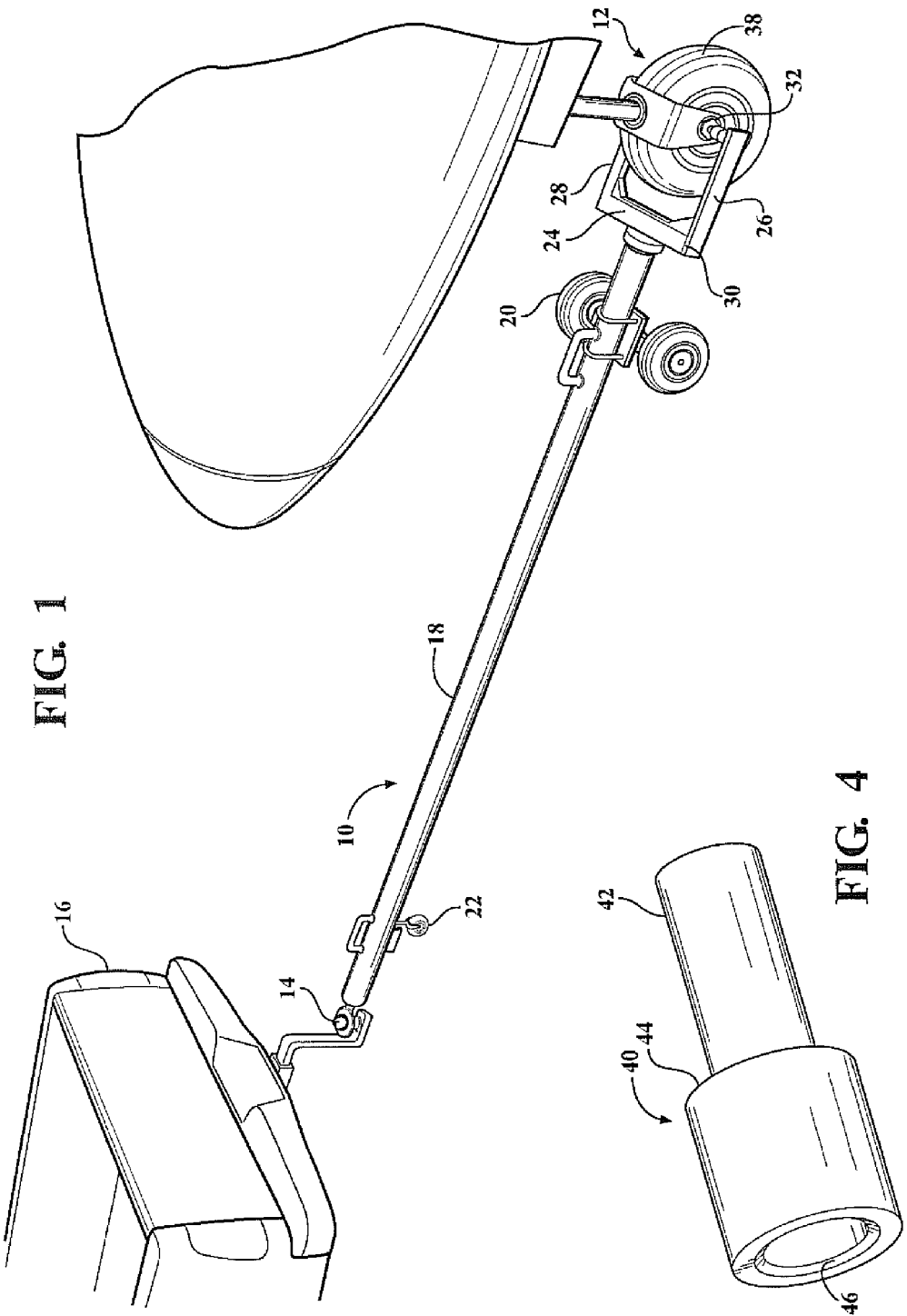
FIG. 1 is a perspective view illustrating a tow bar connecting the nose wheel of a personal aircraft to a towing hitch mounted on a truck.
Figure 2:
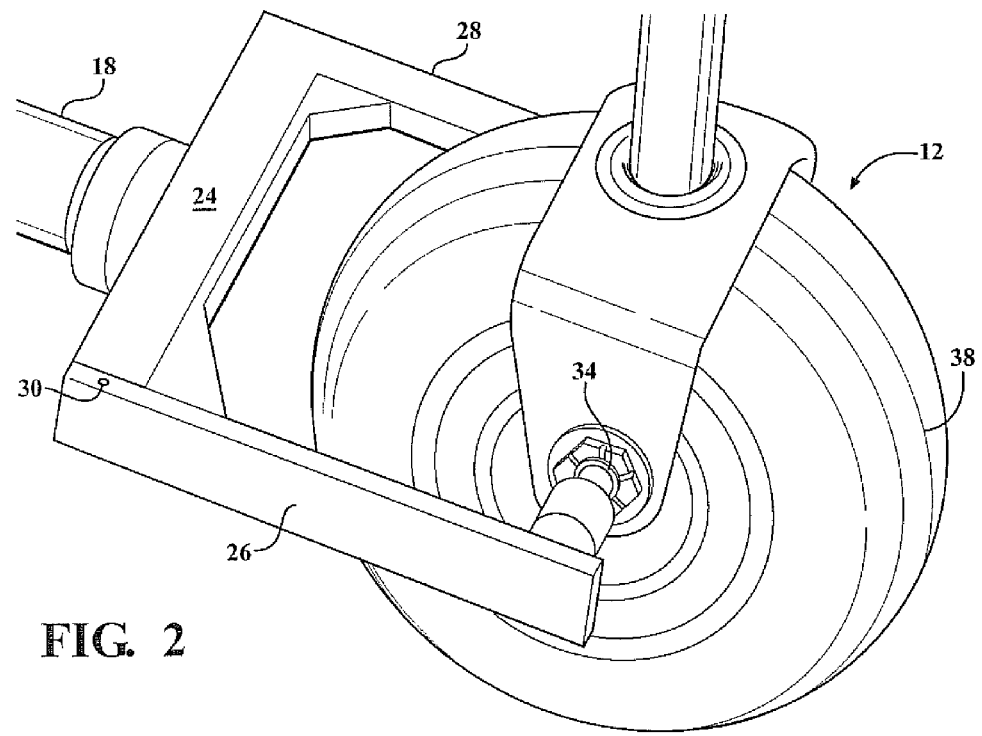
FIG. 2 is a detailed view of the nose wheel and the engagement of the rear end of the tow bar with recesses formed in the nose wheel axle using an adaptor of the type illustrated in FIG. 4.

Referring to FIG. 1, a typical form of tow bar for aircraft is generally indicated at 10. In FIG. 1, the tow bar acts to connect the nose wheel of an aircraft, generally indicated at 12, with some towing means such as the illustrated hitch 14 connected to a truck 16.

The tow bar employs an elongated member 18 which may be tubular and may have a pair of rear wheels 20 which support the bar above the ground along with a forward wheel 22. The rear end of the bar 10 terminates in a cross member 24 extending laterally to the length of the bar 18 in opposed directions, and has a pair of rearwardly extending arms 26 and 28 supported on its opposed ends.

The bar 26 may be connected to the cross member 24 by a hinged connection 30, to allow the arm 26 to swivel toward and away from the axle 30 of the nose wheel 12. Each of the rear ends of the bars 26 and 28 carry opposed cylindrical bosses 32, only one of which is shown in FIG. 1, which are adapted to engage cylindrical bores 34 in the opposed ends of the axle. In alternative types of tow bars, rather than providing a hinged connection, one of the bosses may be slidingly supported in its arm 26 with a spring biasing it toward its extended position so that it may be withdrawn against the spring bias to connect the arm to the axle end.

The tire 38 of the nose wheel may, in certain situations, extend axially sufficiently outwardly along the axle axis to prevent the boss at the end of the arm from engaging the bore 32 in the wheel axle, because that would require a position that interferes with the tire. Accordingly, the present invention constitutes an adaptor, generally indicated at 40, consisting of a rod 42, preferably cylindrical and having an outer diameter that allows it to fit within the bore 32 at the end of an axle. The rod 42 is connected to a coaxial, larger diameter cylindrical hub 44 that has a bore or socket 46 at its other end which is complementary to the bosses 32 which project inwardly from the arms 26 and 28 of the tow bar.

Figure 3:
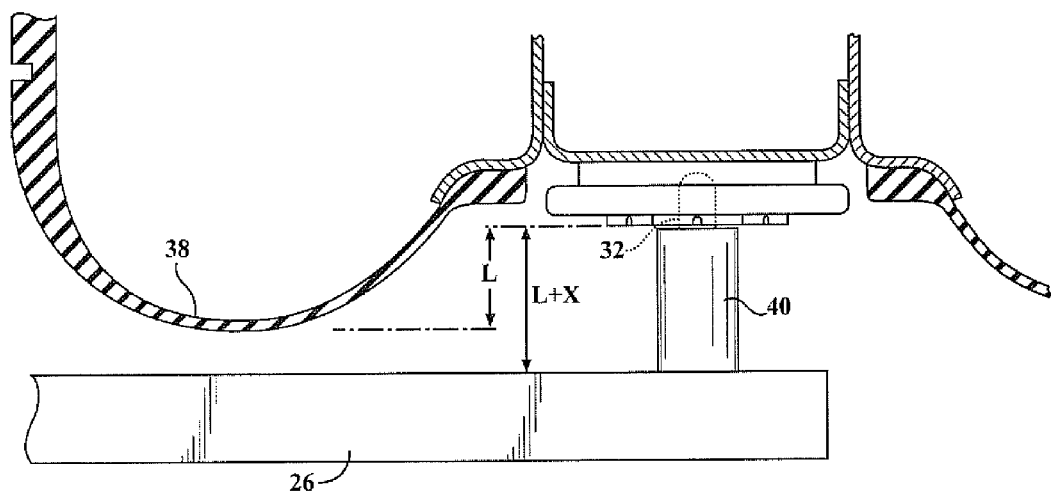
FIG. 3 is a cross-sectional view, partial broken away, of the nose wheel tire and axle end connected to the trailing end of one rearward projecting arm of the tow bar using an adaptor of the type illustrated in FIG. 4.

The end of the cylindrical hub 44 containing a bore 46 will surround the bosses at the end of the arms 26 and 28 so that the end surface of the hub 40 is flush with the interior surfaces of the arms 26 or 28. In the situation in which the axial clearance from the axle outer surface 34 to the axially outer limit of the tire 38 is L, as illustrated in FIG. 3, the axial length of the cylindrical hub 40 plus the length of the rod 42 which projects out of the axle bore 32 when the rod is inserted in the bore must be equal to L+X where X is a sufficient length to allow the cylindrical rod 42 to project within the bore at the axle opening.

The adaptor 40 is easy to employ and various adaptors may be created for different aircraft wheels and tow bars.

Having thus described our invention, we claim:

1. Adaptors for use in connecting aircraft tow bars having an end terminating in a pair of spaced, parallel arms adapted to extend on opposite sides of an aircraft's nose wheel supported on an axle, with the opposed inner, facing sides of each arm having projecting bosses adapted to extend into complementary sockets formed in each end of the nose wheel axle, the axle supporting a wheel carrying a tire that extends by a distance L in an axial direction beyond each end of the axle, each said adaptor comprising:

a cylindrical rod having a first end configuration complementary to the axle end sockets and having a coaxial cylindrical hub of greater diameter than the rod formed at a second end of the rod, the hub having a central socket configured to receive one of the projecting bosses connected to and extending from an inner facing side of an arm, and the length of the second end of the rod from the end of the axle when the first end of the rod engages the axle socket exceeding L, whereby, the first ends of a pair of adaptors may be inserted into the sockets at the opposed ends of the axle and the second ends connected to the projecting bosses at the inner, facing sides of the arm ends, with the parallel arms clearing the tire, allowing the nose wheel to freely rotate during towing and avoiding damage to the tire.

2. The adaptors of claim 1, wherein the intersection between said cylindrical rod and said coaxial cylindrical hub constitutes a shoulder extending normally to the axis of the rod and hub.

* * * * *